May 14, 1963

P. E. PONTIUS ET AL 3,089,575

SYNCHRONIZING CLUTCH

Filed Sept. 22, 1958

INVENTORS
PAUL E. PONTIUS
SHERMAN B. CAMPBELL
BY
Charles L. Lovercheck
ATTORNEY

INVENTORS
PAUL E. PONTIUS
SHERMAN B. CAMPBELL
BY
ATTORNEY

May 14, 1963  P. E. PONTIUS ET AL  3,089,575
SYNCHRONIZING CLUTCH
Filed Sept. 22, 1958  5 Sheets-Sheet 3
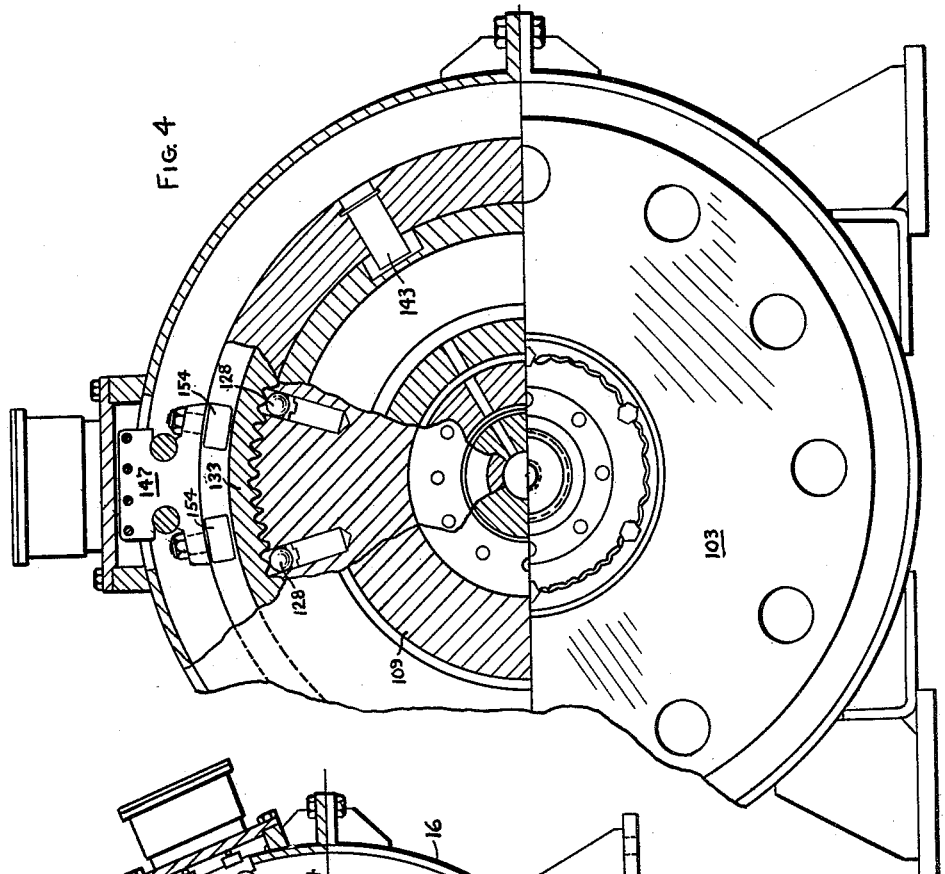
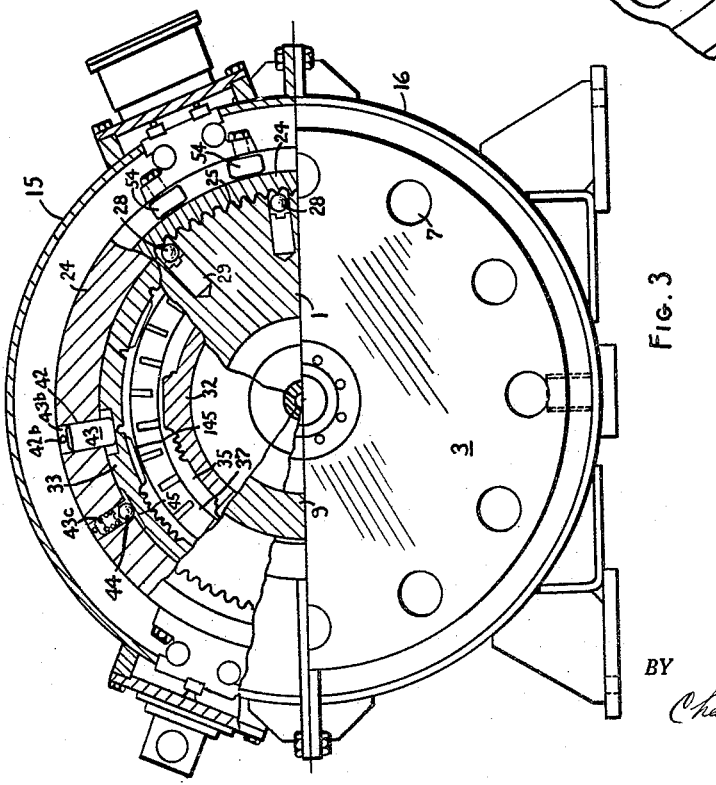
INVENTORS
PAUL E. PONTIUS
SHERMAN B. CAMPBELL
BY
Charles L. Lovercheck
ATTORNEY May 14, 1963 P. E. PONTIUS ET AL 3,089,575
SYNCHRONIZING CLUTCH
Filed Sept. 22, 1958 5 Sheets-Sheet 4

TO PRESSURE RING CYL.

INVENTORS
PAUL E. PONTIUS
SHERMAN B. CAMPBELL
BY
Charles L. Lovercheck
ATTORNEY

May 14, 1963 P. E. PONTIUS ET AL 3,089,575
SYNCHRONIZING CLUTCH
Filed Sept. 22, 1958 5 Sheets-Sheet 5
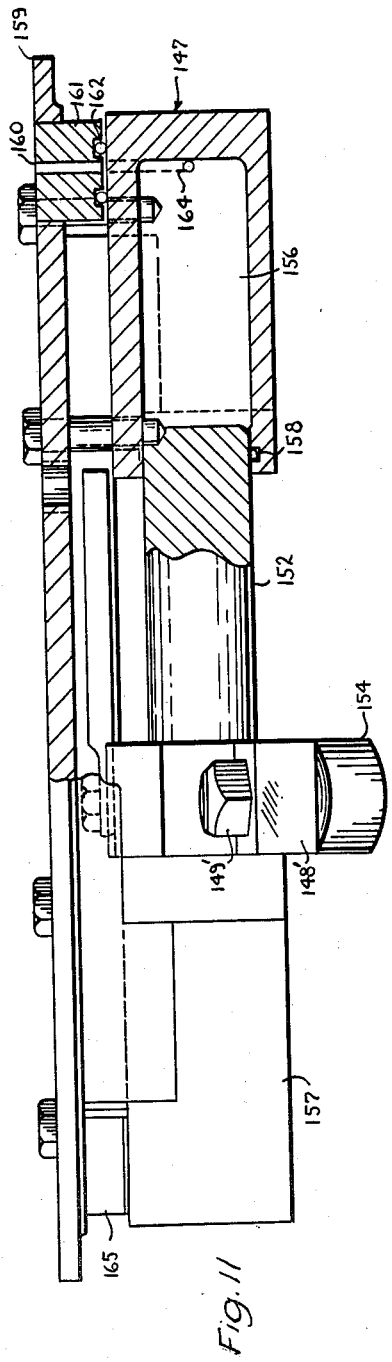
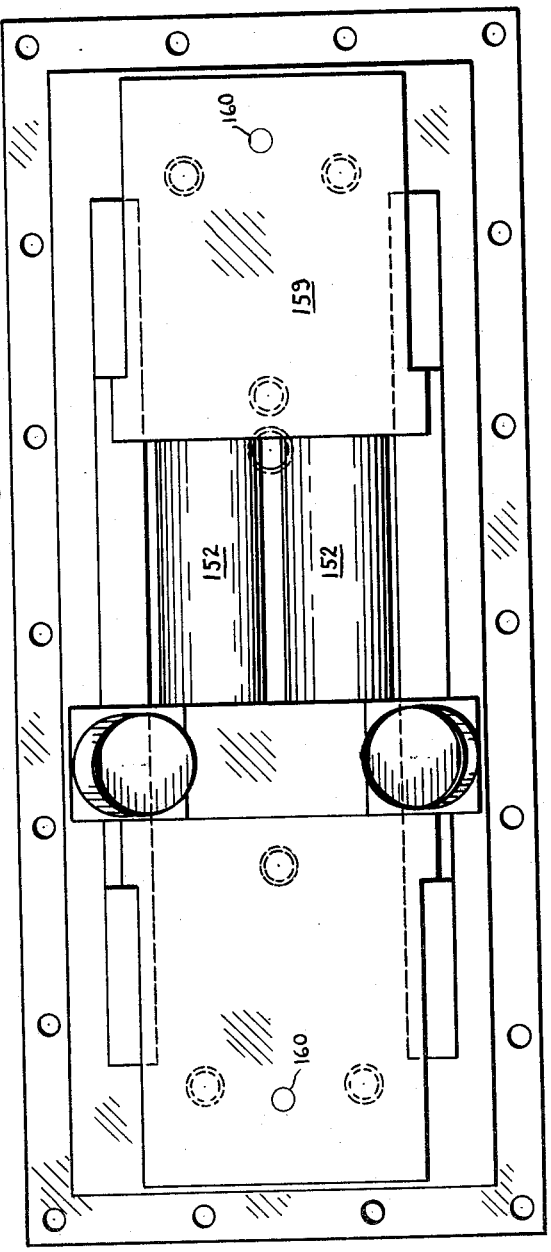
INVENTORS
PAUL E. PONTIUS
SHERMAN B. CAMPBELL
BY
Charles L. Lovercheck
ATTORNEY

United States Patent Office 3,089,575
Patented May 14, 1963

3,089,575
SYNCHRONIZING CLUTCH
Paul E. Pontius, Groton, Conn., and Sherman B. Campbell, Erie, Pa., assignors to Zurn Industries, Inc., Erie, Pa., a corporation of Pennsylvania
Filed Sept. 22, 1958, Ser. No. 762,289
20 Claims. (Cl. 192—53)

This invention relates to clutches and, more particularly, to synchronizing clutches for gear couplings usable in marine drives and other suitable applications.

This application discloses a synchronizing clutch which constitutes an improvement over the clutch disclosed in Patent No. 2,640,573.

In the said patent, a synchronizing clutch is disclosed wherein a series of driven clutch plates are forced into frictional engagement with a series of plates attached to a drive member to transmit a driving force from the driven member to the drive member and thus accelerate the driven member to a synchronizing speed. The drive member plates are forced by means of a series of blocking pins engaging cam surfaces in the periphery of a pressure ring.

Since all of the axial force transmitted to the friction plates is applied by pressure between the blocking pins and the cam surface, a multiplicity of pins is required and the force relationship between the pins and cam surfaces requires that the torque absorbed by the driven shaft drop to about fifty percent of the total torque developed at the friction plates before the clutch will finally engage. This means that a clutch designed to engage a propeller shaft at a speed such that the propeller requires 5,000 ft. lb. of torque will require a clutch capable of developing a total of 10,000 ft. lb. of torque.

It has been discovered that if pressure on the friction plates was produced by hydraulic means behind the pressure ring (in effect, using the pressure ring as a piston), then the blocking pins could be reduced in number and the situation requiring 5,000 ft. lb. of torque at engagement could be handled by a clutch developing only 6,000 ft. lb. total instead of 10,000 ft. lb. Thus, the effective capacity of a given clutch could be increased by eighty percent or more without materially affecting weight or space requirements.

In the present invention, a clutch is disclosed wherein the force is applied directly to the pressure ring by fluid under pressure at the same time or slightly in advance of the time fluid under pressure is being applied to pistons having their rods attached to the blocking pins. By applying fluid pressure directly to the pressure ring, the cam surfaces engaged by the blocking pins may be made with less camber and they may, in some cases, be reduced in number and the aforesaid advantages are possible.

Since the pressure in the present disclosure is applied directly to the pressure ring around its entire periphery, the ring itself will be subjected to less distortion and it will, therefore, engage the clutch plates with a force distributed evenly over the entire surface thereof.

More specifically, it is an object of this invention to provide a synchronizing clutch which is simple in construction, economical to manufacture, and simple and efficient to use and to maintain.

Another object of the invention is to provide an improved synchronizing clutch wherein clutch plates are forced together to provide synchronizing torque by a force applied equally around substantially the entire circumference of the plates.

Still another object of the invention is to provide an improved synchronizing clutch and coupling combination wherein blocking pins apply a force to a pressure ring to move a series of plates and an engaging sleeve in addition to a force applied to the plates by fluid applied axially of the clutch plates.

A further object of this invention is to provide a combination clutch and coupling wherein a shaft is retained at each end in bearings in two relatively rotatable members of the coupling and the shaft is deflected in bending when the two coupling members operate in misaligned relation to each other.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 7:
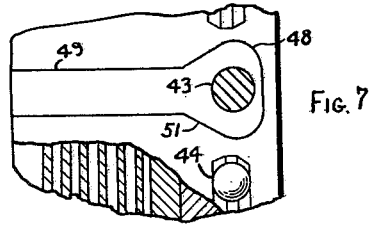
Figure 9:
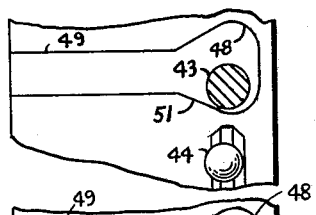
Figure 8:
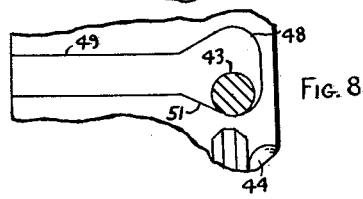
Figure 10:
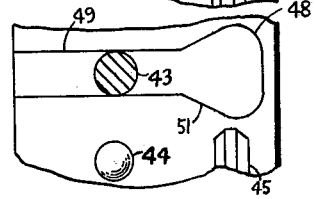
Figure 1:
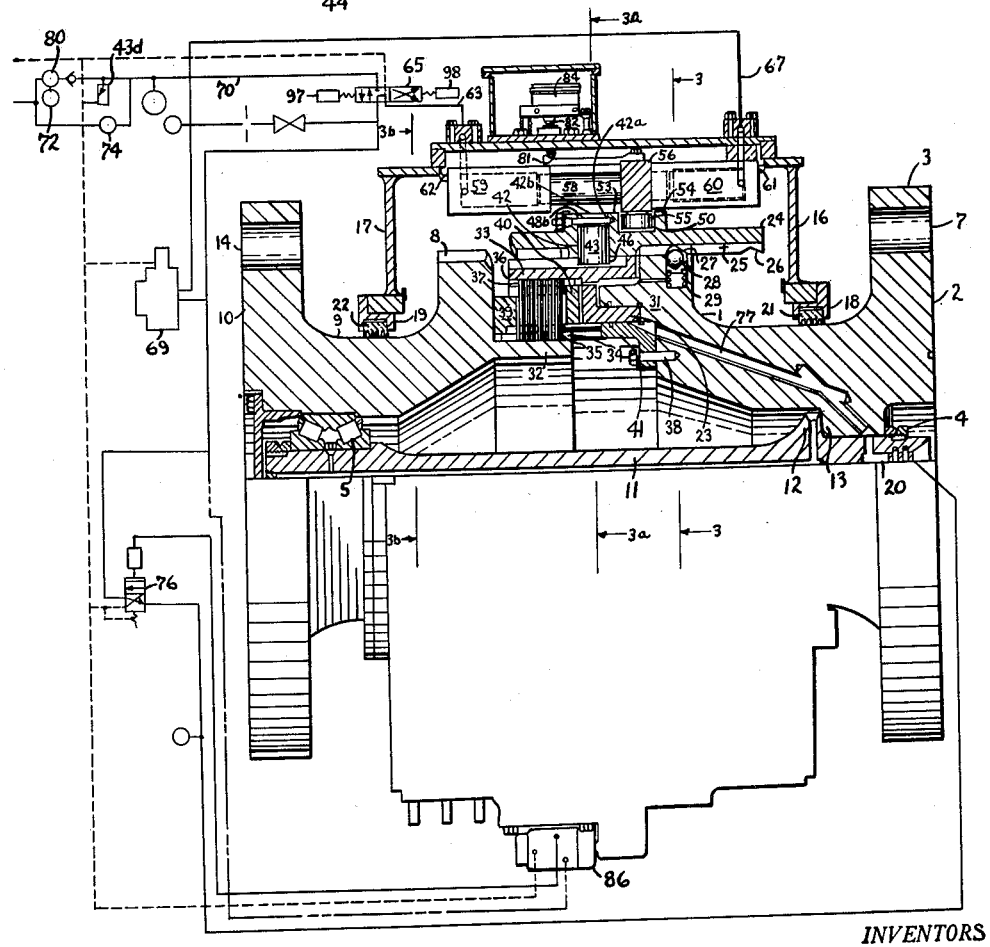
FIG. 1 is a longitudinal cross sectional view of a transmission according to the invention.
Figure 5:
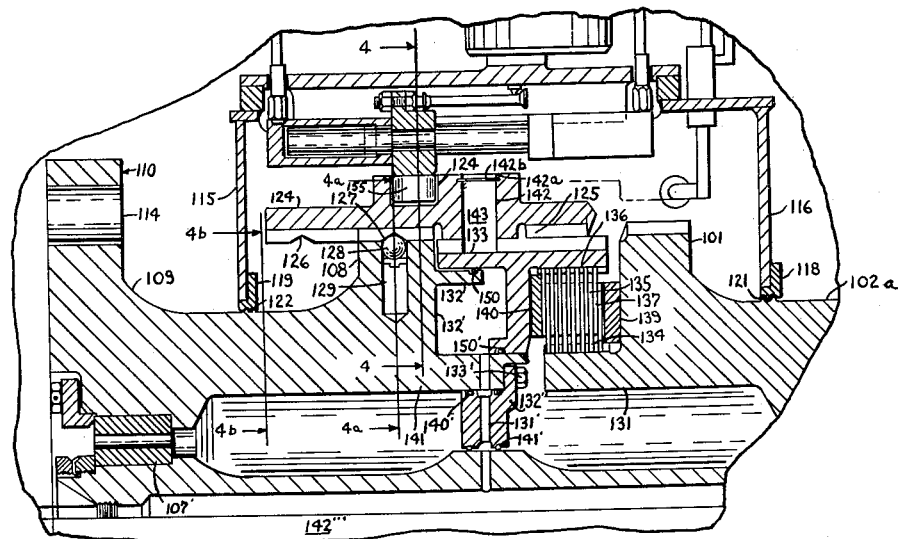
Figure 6:
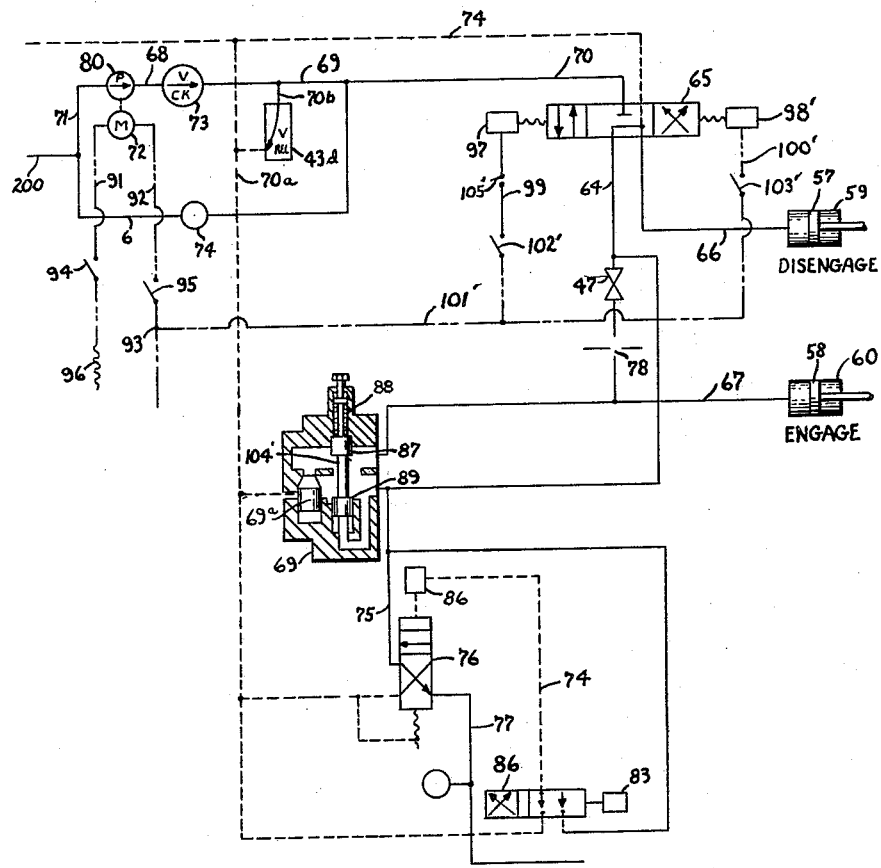

FIG. 3 is a cross sectional view taken on line 3—3 of FIG. 1 in the right hand portion thereof, on line 3a—3a in the central portion thereof, and on line 3b—3b on the left hand portion thereof;

FIG. 4 is a view similar to FIG. 3 of another embodiment of the invention in cross section taken on lines 4—4, 4a—4a, and 4b—4b of FIG. 5;

FIG. 5 is a view similar to FIG. 1 of the embodiment of the invention shown in FIG. 4;

FIG. 6 is a piping diagram of the device and control associated therewith;

FIG. 7 is an enlarged fragmentary plan view of a portion of the periphery of the pressure ring with the blocking pin shown in cross section in a disengaged position and showing the position of a camming member in relation to the blocking pin;

FIG. 8 is a fragmentary plan view of a portion of the periphery of the pressure ring showing the position of a blocking pin at the commencement of the shift and also showing the position of a camming member in relation to the position of the blocking pin;

FIG. 9 is a fragmentary plan view of a portion of the peripheral surface of the pressure ring showing a blocking pin in a position when the speed of the driven gear approaches the speed of the rotating gear and the relative position of one of the camming members with respect to the blocking pin;

FIG. 10 is a fragmentary plan view of a portion of the periphery of the pressure ring in the gear coupling showing the position of a blocking pin and a camming member associated therewith after the driving and driven gears have become synchronized and the splined shifting sleeve has moved into meshing engagement with the teeth on the driven gear;

FIG. 11 is a side view partly in cross section of plug and cylinder assemblies according to the invention;

FIG. 12 is a bottom view of the plug and cylinder assemblies; and

Figure 13:
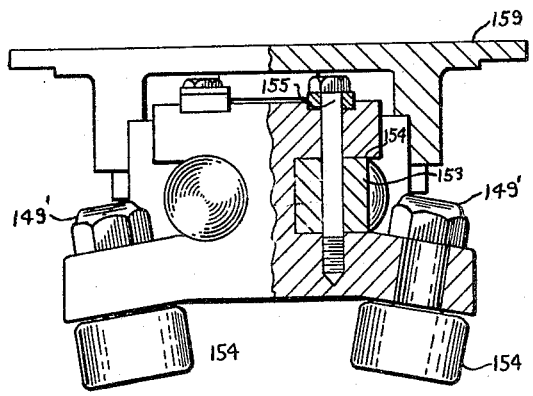

FIG. 13 is an end view of the plug and cylinder assemblies.

Figure 2:
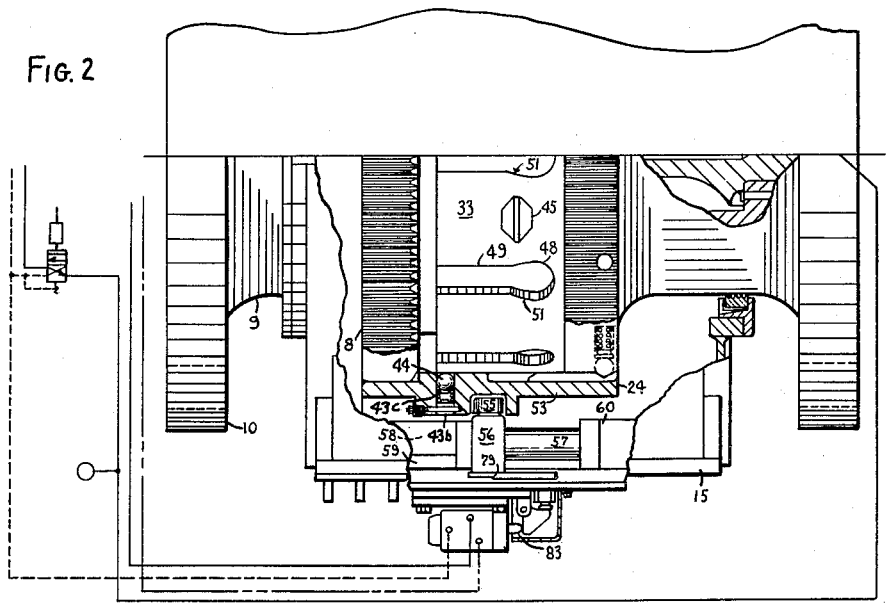
FIG. 2 is a view similar to FIG. 1 with the pressure ring cross sectioned but the sleeve not cross sectioned.

Referring now more specifically to the drawings, FIGS. 1, 2, and 3 show an externally toothed gear 1 formed on a shaft 2 having a flange 3 which may be attached by fitted bolts in bolt holes 7 to an input shaft. A gear 8 is the normally driven gear and the aligned, externally toothed opposing gear 1 is the normally driving gear.

The driven gear 8 has its external teeth aligned with the gear 1 and is formed on a shaft 9 having a flange 10 which may be connected by bolts in holes 14 to a flange on a propeller shaft. A horizontally split housing 15 houses the aligned gear 1 and the gear 8 and it has centrally apertured side walls 16 and 17 supporting suitable annular sealing members 18 and 19 around the periphery of the shafts 2 and 9 to provide a seal therebetween. Sealing members 21 and 22 seal the shafts 2 and 9 and the housing 15 against leakage of lubricant. A shifting sleeve 24 has internal, longitudinally extending, slightly stepped splines 25 for engaging the external teeth of the gears 1 and 8, respectively. The gears 1 and 8 have crowned teeth of the type disclosed in Patent 2,640,573 which allow the driven shaft to operate out of alignment with the drive shaft.

Longitudinally spaced recesses 26 and 27 are circumferentially spaced around the interior of the sleeve 24 for engaging spring urged camming members or balls 28 carried by the gear 1 in radially extending, circumferentially spaced apertures 29 disposed around the periphery thereof. The spring urged balls 28 engage the recesses 27 as shown in FIG. 1 when the gear coupling is in a disengaged position and they engage the recesses 26 when the gear coupling is in an engaged position as shown in FIG. 1. The gear 1 has annular, axially projecting, concentric portions 31 and 41 forming an annular U-shaped chamber or internal cylinder for receiving an axially extending flange 23 on a pressure ring 33 piloted on the inside periphery of the projecting portion 31 of the shaft 2 and acting as an annular cylinder.

A thrust link shaft 11 has a flange 12 engaging a shoulder 13 on the shaft 2 and nuts 4 lock the shaft 11 to the shaft 2. The distal end of the shaft 11 is piloted by bearings 5 in the shaft 9. The bearings 5 are attached to the shaft 11 and to the shaft 9. The shaft 11 is bored at 20 which communicates with a line 77 to pass oil to the cylinder made up of the concentric portion 41 constituting a ring and the concentric portion 31 constituting a flange. The ring 41 has a flange thereon attached to the shaft 2 by studs 38.

The thrust link shaft 11 has an additional function, i.e., to carry end thrust across the spline teeth from the drive shaft 2 to the driven shaft 9. The shaft 11 is made of high strength steel but is of sufficient small diameter that it will flex as the drive and driven shafts 2 and 9 run out of alignment with each other. The thrust link shaft 11 also carries the thrust of the pressure ring 33 during engagement of the clutch.

A projecting flange portion 32 on the gear 8 has external, longitudinally extending splines 34 for engaging internally toothed clutch disks 35. The disks 35 are, therefore, held loosely against relative rotative movement with respect to the gear 8. The pressure ring 33 has internal, longitudinally extending splines 36 for engaging externally toothed clutch disks 37 disposed in overlapping relationship with the clutch disks 35 and adapted to move into frictional engagement therewith upon longitudinal movement of the pressure ring 33. Annular rings 39 and 40 are disposed on opposite sides of the disks 35 and 37, the ring 40 being movable longitudinally with the pressure ring 33. Although disk type clutch plates are shown, other types of friction elements could be incorporated in the gear coupling within the scope of the invention.

The shifting sleeve 24 has circumferentially spaced, radially extending apertures 42 for receiving blocking pins 43 and spring urged camming members or ball members 44 spaced alternately around the inner periphery thereof. The apertures 42 have threaded counterbores 42a for threadedly engaging threaded plugs 42b and 43b to restrain and adjust coil springs 43c and the blocking pins 43. The spring urged balls 44 engage a peripheral groove 45 in the pressure ring 33 and a projecting portion 46 of the blocking pins 43 engages and extends into enlarged ends 48 of circumferentially spaced, longitudinally extending grooves 49 when in a disengaged position as shown in FIGS. 2, 3, and 7. Oppositely disposed tapered walls or cam portions 51 defining tapered shoulders of predetermined angularity are formed on the inner sides of the enlarged ends 48 of the grooves 49 to block the longitudinal movement of the blocking pins 43 after the friction disks 35 and 37 are engaged and upon the continued application of pressure by the pressure ring 33. The blocking pins 43 are held in position by bolts 48b which extend through an axially disposed bore in sleeve 24 and overlie the blocking pins 43.

The shifting sleeve 24 has spaced, outwardly extending, flanged portions 53 and 54 forming a peripheral groove 50 for receiving rollers 55 carried by oppositely disposed shifting members 56. The shifting members 56 have oppositely disposed, balanced pistons 57 and 58 for reciprocable movement in open ended cylinders 59 and 60 which are attached to the side walls 16 and 17 of the housing 15 at 61 and 62.

The cylinder 59 is connected by a pipe 66 and a valve 65 to a pipe 70. The cylinder 60 is connected by a pipe 67 to the pipe 70 through a valve 69, a pipe 64, and the valve 65 to the pipe 70. The cylinder 60 is also connected by the pipe 67 through an orifice, check valve, and the valve 65 to the pipe 70.

Before the load end gear 8 can be meshed to the ring 33, the clutch disks 35 on the load end gear 8 and the clutch disks 37 splined in the sleeve driven pressure ring 33 must be synchronized in speed. When synchronization is complete, release of the friction clutch and meshing of the sleeve and hub are automatic. Previous to engagement, the sleeve in mesh with the power end hub is attached loosely to the pressure ring 33 by the blocking pins 43 which project into the longitudinally extending grooves 49 in the ring 33 and are in the enlarged ends 48 of the grooves 49 under no appreciable pressure from any direction.

When engagement is called for and switches 94, 95, and 105 shown in FIG. 6 are closed, the four-way valve 65 is moved into the engaging position and hydraulic pressure is applied from the pipe 70 to the pipe 64 to the piston of the annular cylinder on the rear face of the pressure ring 33, advancing the ring 33 against the disks 35 and 37 of the friction clutch. Pressure is not applied to the cylinder 60, however, until the valve 69 has time to open.

Consider the power end hub rotating clockwise as viewed from the power end, while the load end hub and shaft are at zero speed. Hydraulic pressure against the piston on the pressure ring 33 causes the clutch disks on the load end hub to be moved against the clutch disks 37 in the pressure ring 33, this pressure being reacted on by the load end hub and its spacer.

The initial torque reaction of the two sets of disks 35 and 37 causes the pressure ring 33 to be rotated on the shoulder extension of the power end hub until the blocking pins 43 are brought into contact with the tapered walls 51 of the enlarged ends 48 of the grooves 49. This is shown in FIG. 8. The advance of the pressure ring 33 moves its detent grooves 45 away from the detent balls 44 in the sleeve. The sleeve does not follow because the restraining force of the hub detent balls is greater than the advancing force of the sleeve detent balls.

After hydraulic pressure builds up in the sequence valve 69, a piston 87 therein opens, allowing engaging pressure to reach the pistons 58. This pressure transmitted to the pistons 58 and the cam rollers or followers 55 moves the sleeve axially toward engagement with the load end hub gear 8. Actually, the sleeve breaks away from the power end hub detent balls and then its own detent balls fall into the pressure ring detent grooves, applying additional axial force. This new engaging force is balanced by the reaction of the blocking pins 43 on the cam portions 51. The axial force is thus transmitted directly to the friction disk clutch.

The sequence valve 69 has a piston 89 connected by a piston rod to the valve piston 87. The valve piston 87 is urged to closed position by a spring 88 when no pressure is impressed on the line 64. When the valve 65 moves to "engage" position, a pressure is impressed in the line 64. This is impressed through a valve 76 to the pressure ring 33 and the clutch disks engage. Pressure in the line 64 reacts on the valve piston 89 and forces the valve piston 87 open, allowing pressure to be impressed on "engage" piston 58. Thus, there is a time delay while piston 87 is opening during which time pressure will be imposed on the pressure ring cylinder. This forces the sleeve 24 to engage the hub teeth. In case of a pressure failure in the line 64, the valve piston 87 will not open and, therefore, the sleeve 24 will not engage. When the valve 65 moves to neutral, the valve piston 87 will close and fluid trapped above the piston 87 will flow to a drain line 70a through a check valve 69a. A switch 102 may be controlled by a timer if the piston 58 does not force the sleeve 24 to engage the hub teeth within a predetermined time.

The slope of the cam portion 51 is such that the force exerted by the blocking pins 43 in moving axially toward the load end is balanced by a component of tangential force perpendicular to this force due to the reaction of the friction disk clutch in transmitting its portion of accelerating torque necessary for synchronizing the shafts plus the friction component between the pins and cam surfaces. The other component of tangential force, also a reaction from the disk clutch, is produced by the internal pressure directly on the pressure ring 33 against the clutch disks.

The torque reaction of the friction disk clutch is due to the torque required to accelerate and drive the shaft. The greater the force exerted in attempting to move the blocking pins 43, the greater will be the torque developed by the friction clutch up to plate capacity and the greater the tangential reaction at the cam grooves which will balance the axial force exerted by the blocking pins 43.

As the shaft approaches synchronous speed, its acceleration requirement drops to zero and the forces at the cams and the blocking pins 43 become unbalanced so that the pins 43 move off the sloping cams into the parallel sided portion of the grooves. When this occurs, the component of axial engaging force applied to the pressure ring 33 and clutch disks by the blocking pins 43 is released and the sliding sleeve moves freely toward engagement with the load end hub flange.

In the device disclosed herein, the cam surface 51 can be made steeper and, therefore, a lesser force may be applied by the actuating pistons. A mathematical analysis of this structure follows:

c—c Cam surface 51 in the pressure ring 33.
$P_a$ Actuating force applied through the sleeve and blocking pins 43.
$P_r$ Component of pressure reaction of the pressure ring 33.
$P_{tf}$ Tangential component pressure due to friction torque developed in friction clutch disks 35.
$P_{a1}$ Tangential component due to $P_a$.
$P_{ip}$ Actuating force developed by internal piston on the pressure ring 33.
$\alpha$ Angle of pressure ring cam surface with lateral plane simple synchronizing clutch such as disclosed in Patent 2,640,573.
$\alpha_1$ Angle of pressure ring cam surface with lateral plane compound synchronizing clutch as disclosed in this application.
K Ratio of tangential force developed at pressure ring cam surface 51 to axial force applied to friction clutch element.

For simple synchronizing clutch $$P_a = P_r \text{ and } P_{tf} \geq P_{a1}$$

During synchronizing $$\frac{P_a}{\cos \alpha} + \frac{P_{a1}}{\sin \alpha} = \frac{P_r}{\cos \alpha} + \frac{P_{tf}}{\sin \alpha}$$

$$P_{tf} = K P_a \frac{P_{tf}}{P_a} = K = \tan \alpha$$

Therefore:

$$K = \frac{P_{tf}}{P_a} = \tan \alpha$$

The angle $\alpha$ must be small enough to make $$P_a \alpha \tan < P_{tf}$$

during initial friction contact and acceleration to synchronize and large enough to allow $P_a \tan \alpha > P_{tf}$ due to torque required to be transmitted after synchronizing so as to allow for final engaging. When friction between the blocking pin and the cam groove is considered, this limits the torque which can be transmitted after synchronization and prior to final engagement to a friction of the torque required to synchronize.

For compound synchronizing clutch—immediately after initiating engaging:

$$P_{tf} = K P_{ip}$$

Blocking pin in sleeve is in pocket at end of cam in pressure ring.

After sufficient hydraulic pressure has been attained in internal cylinder and the sequence valve 69 has been actuated:

$$P_{tf} = K(P_a + P_{ip})$$

Blocking pin in sleeve is balanced on cam surface 51 in pressure ring.

Therefore:

$$K = \frac{P_{tf}}{(P_a + P_{ip})} = \tan \alpha_1$$

Indicating that $\alpha_1$ can be a much larger angle than $\alpha$ in the clutch disclosed in the said patent.

After synchronization—

$P_{tf}$ represents a function of the torque required to be transmitted during final engaging. Inasmuch as $\alpha_1$ is a much larger angle than $\alpha$ and $$P_{ip} = P_a \tan \alpha_1$$

$P_{ip}$ can be a much larger portion of the total torque required to synchronize than in the simple synchronizing clutch. At the time of final engagement of the gear clutch, component $P_{ip}$ is reduced to zero by means of a suitably operated hydraulic valve so as to allow relative movement between the teeth for meshing.

Friction of the cam surfaces in the pressure ring relative to the blocking pins in the sleeve is neglected in the above analysis.

As the pistons 57 and 58 approach the full engagement position, a cam 79 on one of the pistons operates the plunger of a pilot valve 86, allowing hydraulic fluid to flow through a pipe 74 to the pilot valve 86 on the operated valve 76. Operation of this valve stops pressure from a pipe 75 to the line 77 and connects a pipe 70a to the bleed line 77 and thus maintains the system pressure. Cutting off direct hydraulic pressure from the pressure ring 33 by the bleed line 77 allows the pressure ring 33 to return to its normal position, the pressure from the blocking pins 43 having already been released.

This also frees the shifting sleeve 24 so that the external teeth of the hub can enter the internal teeth. As the pistons 57 and 58 approach engagement, the cam 79 attached to the piston rod of the cylinders 59 and 60 will engage a detent 81 and open a switch 84. This will allow the valve 65 to return to neutral and it will release pressure in the engaging cyinders 59 and 60 and the oil flows to the drain pipe 74.

When disengagement is called for and the four-way valve is moved into the disengaging position by closing switch 103', hydraulic pressure is applied to the disengaging piston 57. This in turn moves the shifting sleeve 24 into the disengaged position. The pipe 67 is connected to the drain pipe 70a throughout the disengaging cycle through the valve 69 and the check valve 69a. A valve 47 is normally locked but may be opened to allow fluid to flow through an orifice 78 to test the system.

In the embodiment of the invention shown in FIGS. 4 and 5, a coupling similar to that shown in FIGS. 1 and 2 is shown. An externally toothed gear 101 is shown formed on a shaft 102a. The gear 101 is aligned with an externally toothed gear 108. The gear 108 is formed on a shaft 109 and has a shaft 110 which may be connected by bolts in holes 114 to a flange on an entrance shaft. A horizontally split housing houses the aligned gears 101 and 108 and has centrally apertured side walls 115 and 116 which support suitable annular sealing members 118 and 119 around the peripheries of the shafts 102a and 109. Sealing members 121 and 122 seal the apertures in the side walls 115 and 116 and the shaft and housing against leakage of lubricant.

A shifting sleeve 124 has internal, longitudinally extending, slightly stepped splines 125 for engaging the external teeth of the gears 101 and 108, respectively. Longitudinally spaced recesses 126 and 127 are circumferentially spaced around the interior of the sleeve 124 for engaging spring urged camming members or balls 128 carried by the gear 101 and radially extending from circumferentially spaced apertures 129 disposed around the periphery thereof. The spring urged balls 128 engage the recesses 127 as shown in FIG. 5 when the coupling is disengaged and they engage the recesses 126 when the coupling is in an engaged position as shown.

The gears 101 and 108 have annular, axially projecting concentric flange portions 132 and 141 forming an annular chamber in a counterbore 132' so that a pressure ring 133 is piloted on the outer periphery of the portion 132 and on a surface 132" of the gear 108.

The projecting portion on a flange 131 has external longitudinally extending splines 134 for engaging internally toothed clutch disks 135. The disks 135 are therefore held loosely against relative rotational movement with respect to the gear 101. The pressure ring 133 has internal, longitudinally extending splines 136 for engaging an externally toothed clutch disk 137 disposed in overlapping relation with the disk 135 and adapted to move into frictional engagement therewith upon longitudinal movement of the pressure ring 133. Annular spacers 139 and 140 are disposed on opposite sides of the disks 135 and 137.

The shifting sleeve 124 has circumferentially spaced, radially extending apertures 142 for receiving blocking pins 143. Spring urged camming members or balls 144 corresponding to balls 44 in FIG. 3 are spaced alternately around the inner periphery thereof. The spring urged balls 144 engage a peripheral groove 145 and the pressure ring 133; and projecting portions 146 of the blocking pins 143 engage and extend into enlarged ends 148 of circumferentially spaced, longitudinally extending grooves 149.

The action of the clutch shown in the embodiment of the invention in FIGS. 4 and 5 is similar to that shown in the other figures. The important difference in this embodiment is the change in fluid passage which flows through the center of the shaft at 142" and up through laterally disposed passages 131' into the chamber between the surfaces of the counterbore 132' and the pressure ring 133. An O-ring groove 150 is cut in the flange portion 132 to receive an O-ring and a similar groove 150' is formed in the internal surface of the pressure ring 133 to receive a packing washer O-shaped in cross section. The shaft extension 142" is attached to the gear 101 and is piloted on the gear 108 by a bearing 107'. A seal ring 132" is attached to the gear 108 by a bolt 133' and O-rings 140', 141", and 142' prevent leakage of oil. The oil passage 131' conveys oil from a passage 142''' to the counterbore 132'.

In FIGS. 1, 11, 12, and 13, plug in cylinder assemblies 147 support the rollers 55 which are in the form of followers mounted on threaded shafts secured to yokes 148' by nuts 149'. The yokes 148' are attached to pistons 152 which are in the form of elongated cylinders having a reduced size intermediate portion 153. The cylinders are received in grooves 154 in the yokes 148' and are locked thereto by means of a bolt 155 which clamps the reduced size portion 153 therein.

The opposite ends of the pistons 152 are received in bores 156 in cylinders 157. The cylinders 157 are each made of flat plates having the bores 156 therein and one is disposed at each end of the pistons 152. Piston rings which are in the form of flexible O-rings 158 are disposed in inner peripheral grooves in the bores 156 in the cylinders 157. The piston rings 158 form sealing engagement with the outer periphery of the pistons 152 and the inside of the cylinders 157. The cylinders 157 are fixed to a plate 159 which is in turn attached to the housing of the machine and extends through an opening therein.

A bore 160 is formed in a welded plug 161 which is welded in an opening in the plate 159 and a sealing ring 162 forms sealing engagement with the outer periphery of the cylinder and forms a seal for oil which may pass through the bore 160 and into a bore 164 which communicates with the inside of the cylinders 157. A similar plug 165 is attached to the opposite end of the plate 159 and a bore therein supplies oil to the inside of the cylinder on the opposite end from that shown in cross section in FIG. 11. Therefore, when oil is supplied through the pipe 66, the followers 55 are forced in one direction and when oil is supplied to the pipe 67, the followers 55 are forced in the opposite direction.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In a disengageable gear coupling, in combination, a hubbed externally toothed driving gear, a hubbed externally toothed driven gear, an internally splined sleeve for engaging the teeth of said gears, an annular pressure ring slidably mounted on the hub of said driving gear concentrically of said sleeve and intermediate said driving gear and said driven gear having circumferentially spaced, longitudinally extending first peripheral grooves on the periphery thereof and a circumferential groove, said longitudinally extending grooves having enlarged portions adjacent the driving gear side thereof with tapered shoulders, longitudinally movable annular disks rotatable with said pressure ring, annular disks on said hub of said driven gear and rotatable therewith frictionally engageable with said longitudinally movable disks rotatable with said pressure ring to initially transmit rotative force from said driving gear to said driven gear upon initial longitudinal movement of said sleeve, blocking pins spaced around the inner periphery of said sleeve for disposal in said longitudinally extending grooves of said pressure ring, means to move said blocking pins longitudinally in said ring when said driven gear is synchronized with said driving gear, piston means on said pressure ring disposed concentric to the axis of said driving gear and inward of said driving gear applying a force generally uniformly around the entire circumference thereof urging said ring longitudinally, means actuated after said force has been exerted on said pressure ring for a predetermined time, moving said blocking pins into engagement with said tapered shoulders in said enlarged ends of said grooves after longitudinal movement of said ring toward said driven gear until the speed of said driven gear is synchronized with the speed of said driving gear whereby said pins will be moved longitudinally in said first peripheral grooves, releasing said disks and said pressure ring and moving said sleeve into engagement with both said gears, a second peripheral groove in said pressure ring, and spring urged balls carried by said sleeve engaging one side of said second peripheral groove in said pressure ring.

2. The gear coupling recited in claim 1 wherein spring urged camming members are carried by and spaced around the circumference of said driving gear for engagement with longitudinally and circumferentially spaced recesses on the inner side of said sleeve to position said sleeve in an engaged and a disengaged position.

3. In a disengageable gear coupling, in combination, a hubbed externally toothed driving gear, a hubbed externally toothed driven gear, an internally splined sleeve for engaging the teeth of said gears, an annular pressure ring slidably mounted on the hub of said driving gear concentrically of said sleeve and intermediate said driving gear and said driven gear having circumferentially spaced, longitudinally extending grooves on the periphery thereof and a peripheral groove, said longitudinally extending grooves having enlarged portions adjacent the driving gear side thereof with tapered shoulders, longitudinally movable annular disks rotatable with said pressure ring, annular disks on said hub of said driven gear and rotatable therewith frictionally engageable with said longitudinally movable disks rotatable with said pressure ring to initially transmit rotative force from said driving gear to said driven gear upon initial longitudinal movement of said sleeve, blocking pins spaced around the inner periphery of said sleeve for disposal in said longitudinally extending grooves of said pressure ring, piston means on said pressure ring applying a force generally uniformly around the entire circumference thereof urging said ring longitudinally, said blocking pins being adapted to engage said tapered shoulders in said enlarged ends of said grooves after longitudinal movement of said ring toward said driven gear until the speed of said driven gear is synchronized with the speed of said driving gear to move said pins longitudinally of said grooves, releasing said disks and said pressure ring and moving said sleeve into engagement with both said gears, spring urged balls carried by said sleeve engaging one side of said peripheral groove in said pressure ring, a supply of fluid under pressure, means selectively connecting said supply of fluid to said piston means, means on said blocking pins for moving said sleeve, time delay means, said time delay means connecting said supply of fluid to said means on said blocking pins moving said sleeve into engagement with said gears a predetermined time after said fluid pressure is applied to said piston means, and limit means for stopping the force of said fluid on said piston means when said sleeve has engaged said gears.

4. The coupling recited in claim 3 wherein said means to selectively connect said supply of fluid to said piston means comprises a selector valve and a sequence valve for connecting said supply of fluid to said blocking pins after it has been connected to said piston means.

5. In a disengageable gear coupling, in combination, an externally toothed driving gear, an externally toothed driven gear, an internally splined sleeve engageable with the teeth of said gears, an annular pressure ring disposed intermediate said driving gear and said driven gear and enclosed therebetween by said sleeve, said pressure ring having circumferentially spaced, longitudinally extending grooves on the periphery thereof with enlarged portions adjacent the driving gear side thereof defining tapered shoulders, an annular groove connecting said enlarged portions of said grooves, cooperating disks rotatable with said pressure ring and said driven gear, respectively, frictionally engageable with each other for transmitting rotative force therebetween, blocking pins spaced around the inner periphery of said sleeve for disposal in said longitudinally extending grooves of said annular ring adapted to engage said tapered shoulders in said enlarged portions of said grooves upon initial longitudinal movement of said pressure ring toward said driven gear until the speed of said driven gear is synchronized with the speed of said driving gear whereby said pins will be able to move longitudinally of said grooves, spring urged balls circumferentially aligned with said blocking pins and engageable with said annular groove around said pressure ring, said sleeve forcing said balls from said annular groove and releasing said disks from frictional engagement with each other upon longitudinal movement of said blocking pins in said grooves, actuating means for moving said sleeve longitudinally, piston means on said pressure ring disposed inward of said driving gear extending around substantially the entire circumference thereof, cylinder means on said coupling receiving said piston means, and fluid pressure means actuated by said actuating means for said sleeve actuating said piston means subsequent to the time the force is first exerted on said pressure ring to move said ring and said sleeve in synchronism with each other.

6. In a disengageable gear coupling, in combination, an externally toothed driving gear, an externally toothed driven gear, a splined cylindrical sleeve engaging the teeth of said driving gear, a pressure ring disposed between said driving gear and said driven gear enclosed by said sleeve between said gears, said pressure ring having circumferentially spaced, longitudinally extending grooves with enlarged ends defining tapered shoulders on the driving gear end thereof, cooperating friction disks rotatable with said driven gear and said pressure ring, respectively, and frictionally engageable with each other for initially rotating said driven gear, blocking means carried by said sleeve initially engaging said tapered shoulders in said grooves in said sleeve until the speed of said driving gear and said driven gear is synchronized, actuating means, operating means for said sleeve operated by a force means synchronized with an operating means for each said actuating means engageable with opposite sides of said sleeve for moving said sleeve longitudinally, and means on said pressure ring extending continuously around substantially the entire circumference thereof inward of said driving gear engaged by said actuating means forcing said pressure ring longitudinally, urging said friction disks together, said friction disks and the engagement of said blocking means with said tapered shoulders of said grooves being released before engagement of said splined sleeve with said gears upon longitudinal movement of said blocking means in said grooves.

7. A disengageable gear coupling comprising an externally toothed driving gear, an externally toothed driven gear, a splined cylindrical sleeve engaging the teeth of said driving gear, a pressure ring disposed between said driving gear and said driven gear enclosed by said sleeve between said gears, said pressure ring having spaced, cooperating first friction disks rotatable with said driven gear and second spaced friction disks rotatable with said pressure ring, respectively, and frictionally engageable with each other for initially rotating said driven gear, a groove in said driving gear concentric to the axis of rotation thereof, an axially extending flange on said pressure ring disposed around the axis thereof concentric thereto, said flange received in said groove in said driving gear and forming a piston therein, hydraulic pressure means connected to said groove in said driving gear, control means to actuate said hydraulic pressure means to urge said disks into frictional engagement with each other, and means synchronized with said hydraulic pressure means to move said splined sleeve to connect the teeth of said external gears when said driven gear has been accelerated by said friction disks.

8. The coupling recited in claim 7 wherein said hydraulic pressure means comprises said driving gear having a fluid flow passage through the central portion thereof communicating with said groove in said driving gear and pressure means for inserting fluid under pressure thereinto.

9. A coupling comprising a first and a second external gear spaced axially from each other, a sleeve having internal teeth thereon engaging the teeth of said first external gear and slidable to engage said second external gear, a pressure ring disposed concentric of said sleeve and fixed to rotate with said first external gear, first friction plates fixed to rotate with said pressure ring, second friction plates interfitting with said first friction plates fixed to rotate with said second gear, hydraulic piston means connected to said pressure ring and to said first gear concentric to said first gear and inward thereof for urging said pressure ring and said first plates into frictional engagement with said second plates, means on said sleeve to move said sleeve initially toward said second gear, and means to restrain said sleeve from engaging said second gear until said second gear has been accelerated to substantially the speed of said first gear by said friction plates, and means to exert a pressure on said pressure ring in synchronism with a pressure on said sleeve.

10. The coupling recited in claim 9 wherein said means to restrain the movement of said sleeve comprises spaced, axially disposed grooves in the periphery of said pressure ring, radially disposed blocking pins in said sleeve extending into said grooves in said pressure ring, said grooves having enlarged portions on one end thereof, said blocking pins being disposed in said enlarged portions of said grooves initially before said sleeve engages said second gear, the edges of said enlarged portions of said grooves obstructing the movement of said blocking pins when said friction plates are initially engaged, and means to apply a force on said sleeve to urge said sleeve toward said second gear.

11. The coupling recited in claim 10 wherein said pressure ring has a circumferentially extending peripheral groove engaged by said means to apply a force on said sleeve when said sleeve is in its initial position disengaged from said second gear, and ball detents moving out of said peripheral groove when said sleeve moves toward said second gear.

12. A coupling comprising a first and a second external gear spaced axially from each other, a sleeve having internal teeth thereon engaging the teeth of said first external gear and slidable to engage said second external gear, a pressure ring disposed concentric of said sleeve and fixed to rotate with said first external gear, first friction plates fixed to rotate with said pressure ring, second friction plates interfitting with said first friction plates fixed to rotate with said second gear, hydraulic piston means connected to said pressure ring and to said first gear for urging said pressure ring and said first plates into frictional engagement with said second plates, means on said sleeve to move said sleeve initially toward said second gear, means to restrain said sleeve from engaging said second gear until said second gear has been accelerated to substantially the speed of said first gear by said friction plates, said means to restrain the movement of said sleeve comprising spaced, axially disposed grooves in the periphery of said pressure ring, radially disposed blocking pins in said sleeve extending into said grooves in said pressure ring, said grooves having enlarged portions on one end thereof, said blocking pins being disposed in said enlarged portions of said grooves obstructing the movement of said blocking pins when said friction plates are initially engaged, means to apply a force on said sleeve to urge said sleeve toward said second gear, said pressure ring having a peripheral groove engaged by said means on said sleeve when said sleeve is in its initial position disengaged from said second gear, ball detents moving out of said peripheral groove when said sleeve moves toward said second gear, a valve means connecting a source of hydraulic fluid to said piston means on said pressure ring, and cam means on said sleeve disconnecting said source of hydraulic fluid from said piston means when said sleeve engages said second gear.

13. The coupling recited in claim 12 wherein an orifice means is provided to conduct hydraulic fluid to said piston means at a limited rate initially when said hydraulic means is actuated, and bypass means applying hydraulic fluid pressure to said piston means at a greater rate after a predetermined time.

14. The coupling recited in claim 13 wherein said piston means comprises spaced flange members on said first gear concentric to the axis of rotation thereof, and spaced flanges on said pressure ring concentric to the axis of rotation thereof and interfitting with said flanges on said first gear and slidable thereon and defining an annular fluid chamber therebetween, said means connecting said source of hydraulic fluid to said chamber.

15. The coupling recited in claim 13 wherein said piston means comprises spaced, axially extending flanges on said first gear concentric to the axis of rotation thereof, an annular axially extending flange on said pressure ring disposed between said flanges on said first gear and slidable thereon, and sealing means between said axially extending flange and said flanges on said first gear, said flanges on said first gear defining an annular cylinder and said flange on said pressure ring defining a piston slidable therein.

16. A coupling comprising a first gear attached to a driving shaft and a second gear connected to a driven shaft, means on one said gear being slidable into and out of engagement with the other said gear, clutch means for connecting said shafts to accelerate said driven shaft to synchronizing speed with the other prior to engagement of said other gear with said means on said one gear, means to engage said clutch means, said engaging means comprising a member having a side surface engaging said clutch means and a circumferential surface, an axially disposed slot having an enlarged end in said circumferential surface, means slidably supported on said second gear including a pin received in said slot and disposed in said enlarged end prior to engagement of said gears, and means to apply a force to said engaging means moving it toward said first gear whereby said pin is forced against the walls of said slot to apply an engaging force to said clutch means, said means to apply a force to said second gear comprising a hydraulic pressure means disposed concentric to the axis of said first gear and inward of said first gear applying a force directly to said clutch means to force it into engagement, said clutch means comprising a disk attached to said drive shaft, and a disk attached to said driven shaft, said member having said surface comprising a ring concentric to said driven shaft and engaging one said disk to force said disk into driving relation with the other said disk, a groove in a member concentric to said driven shaft and opening toward said drive shaft and defining an annular pressure cavity, said ring having a portion thereof extending into said pressure cavity and slidable in and out thereof, said hydraulic pressure means being connected to said pressure cavity.

17. The coupling recited in claim 16 wherein said drive shaft and said driven shaft are disposed generally in axial alignment with each other and a pilot shaft is attached to said drive shaft and extends into a pilot thrust bearing in said driven shaft whereby end thrust or internal thrust between said shafts is transmitted from one to the other.

18. The coupling recited in claim 17 wherein said means on said one gear comprises an internally toothed gear having spaced blocking pins extending inwardly radially thereof, means to move said internally toothed gear comprising hydraulic pressure means connected to said internally toothed gear, axially extending grooves in the outer periphery of said pressure means, and enlarged ends on said grooves receiving the inner ends of said blocking pins initially, said blocking pins engaging the cam surfaces formed by the walls of said enlarged ends of said grooves, preventing said internally toothed gear from sliding when said hydraulic pressure means initially urges said internally toothed gear, said blocking pins moving into alignment with said grooves as said driven gear approaches synchronized speed with said drive gear.

19. The coupling recited in claim 18 wherein means to move said internally toothed gear comprises spring loaded detent balls supported in said internally toothed gear, a circumferential groove in said ring receiving a part of said balls initially, said balls being forced out of said circumferential groove as said internally toothed gear moves toward said drive gear.

20. In combination, a drive gear and a driven gear adapted to be disengaged from each other, means to move said gears into engagement with each other, means to connect said driven gear to said drive gear to accelerate said drive gear into synchronized speed with said driven gear, said means to connect and accelerate said drive gear comprising clutch means, actuating means for said clutch means, said actuating means comprising means concentric to and inside said drive gear to apply a hydraulic pressure directly on a pressure ring, means to apply a force to a cam surface on the periphery of said pressure ring, said means to apply a force to the periphery of said pressure ring comprising said cam surface, and a blocking pin engaging said cam surface, the ratio of the tangential component of pressure due to friction torque of said clutch means to the actuating force applied to the periphery of said clutch means plus the force applied to said pressure ring being a constant determined by power to be transmitted by said clutch means.

References Cited in the file of this patent

UNITED STATES PATENTS

| | | |
|---|---|---|
| 1,950,914 | Blakely | Mar. 13, 1934 |
| 2,633,955 | Allen et al. | Apr. 7, 1953 |
| 2,640,573 | Shenk | June 2, 1953 |
| 2,771,794 | Shenk et al. | Nov. 27, 1956 |